UNITED STATES PATENT OFFICE.

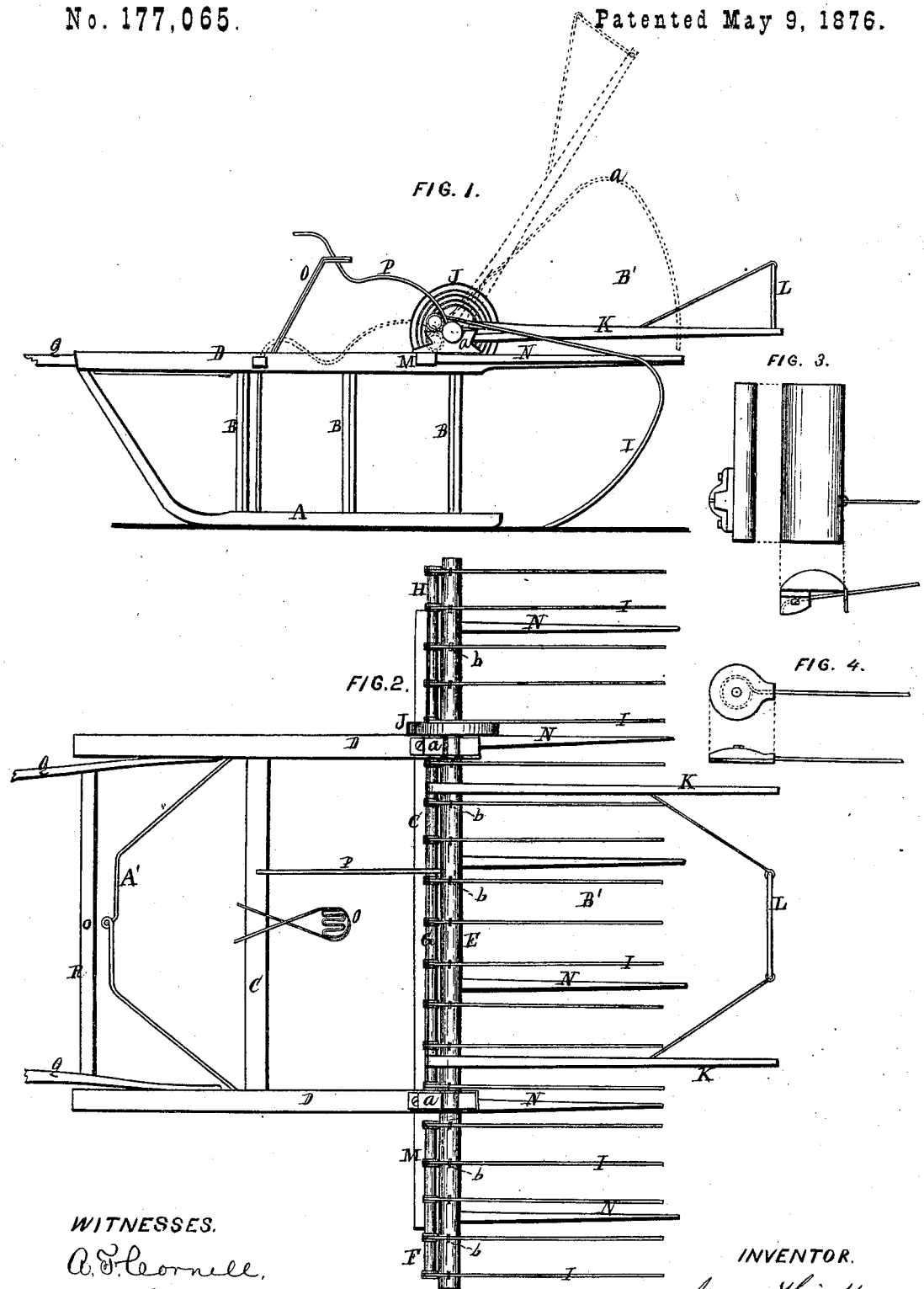

JAMES HIATT, OF CHESTERFIELD, OHIO.

IMPROVEMENT IN HORSE HAY-RAKES.

Specification forming part of Letters Patent No. 177,065, dated May 9, 1876; application filed October 16, 1875.

*To all whom it may concern:*

Be it known that I, JAMES HIATT, of Chesterfield, in the county of Morgan and State of Ohio, have invented a certain new and Improved Horse Hay-Rake; and I do hereby declare that the following is a full, clear, and complete description thereof, reference being had to the accompanying drawings, making a part of the same.

Figure 1 is a side view of the rake. Fig. 2 is a plan view. Figs. 3 and 4 will be referred to in the course of the description.

Like letters of reference refer to like parts in the several views.

The invention relates to a spring and connected devices for elevating the rake and discharging the hay, whereby is avoided a forward lifting of the rake, either directly by hand or by a system of levers. The said mechanism is mounted upon a sled or carriage.

A more full and complete description of the invention is as follows:

The sled referred to consists simply of a pair of runners, A, legs B, beams C, and rails D, all of which is or may be constructed in the ordinary way. To the top of the rear end of each of the sled-runners is secured a journal-seat, a, in which is fitted a shaft, E, forming a part of the head of the rake. To the side of the shaft are firmly secured bars F, G, and H, to which the teeth I of the rake are fastened by the ends being wrapped around the bars and soldered thereto, or otherwise secured. The teeth are also fastened to the shaft E by means of staples b, as will be seen in the drawing. J is a spring, the inner end of which is attached to the shaft E, whereas the outer end is attached to the sled. The disposition of the spring is such that on bringing the teeth of the rake down upon the ground, as shown in Fig. 1, it is thereby wound up, whereas the recoil of the spring elevates the rake to the position indicated by the dotted lines a, lifting it from the ground for discharging the raked hay. T^ the head of the rake are secured the handles K, the outer ends of which are connected to each other by a bent rod, L, whereby to hold the rake. M is a bar extending across the ends of the sled, and from which project rearward fingers N, which, together with the bar, forms a stripper, the purpose of which will presently be shown.

In raking hay by an ordinary wheel horse-rake on hilly lands, and more especially if said lands are much uneven, the wheels of the rake are very liable to slip down the hill-side, and also to drop into the hollows and depressions of the ground, the result of which is to cause the teeth of the rake to strike into the ground or catch and drag heavily along over the hummocks, thereby tearing up the sods and doing the raking badly. To avoid this objectionable feature of the common wheel horse-rake, I attach the rake to the hind end of a light sled-frame, in the manner as above described, and use the runners instead of wheels for drawing and carrying the rake. Said runners by their length will slide along over the ground without slipping laterally, as their length upon the ground gives them a stronger hold thereon than a pair of wheels would have which have but a slight bearing upon the ground at one time. The runners also are less liable to drop into hollows, for, by their length, they will reach across them, and carry the rake over without catching. The tendency of the rake is to lift from the ground in consequence of the reaction of the spring, so that the operator, on walking behind the rake, needs simply to hold down the rake by taking hold of the handles, or the cross-bar L thereof, which, when the rake is full, he ceases to bear down thereon. The rake will then be lifted by the recoil of the spring, and the gathered hay will be left by the withdrawal of the rake-teeth from the hay. In the event the hay is inclined to lodge in the teeth of the rake when they are being lifted, the stripper above described will push it from the rake, leaving it clear for further raking.

The operator may either follow the rake while using it, holding on by the handles K, or he may ride by taking his place on the seat O. In the event he rides, the rake is held down by a lever, P, which the operator holds by the hand, which, when the rake is full, he allows to drop, thereby permitting the rake to rise by virtue of the recoil of the spring. One spring only is shown, and that near one end of the rake head. Two may be used, one at each end, should one be insufficient to lift the rake.

The bars F, G, and H may be dispensed with, and the teeth secured directly to the shaft by a modified way of attachment shown in Figs. 3 and 4.

Ordinarily the rake is drawn by the thills Q, the whiffletree being secured to the cross-bar R in the ordinary way. In some cases, as on steep side-hills, it will be desirable to dispense with the thills, in which event the rake is drawn by the draft-rod A'.

What I claim as my invention, and desire to secure by Letters Patent, is—

In horse-rakes, the spring J, rake B', shaft E, and bar C, arranged as described, in combination with the handles K, bar L, and arms N, substantially as and for the purpose set forth.

JAMES HIATT.

Witnesses:
J. H. BURRIDGE,
M. C. WARNER.